US011970236B2

(12) United States Patent
Praveen et al.

(10) Patent No.: US 11,970,236 B2
(45) Date of Patent: Apr. 30, 2024

(54) STEERING MECHANISM FOR A VEHICLE

(71) Applicants: Vijay K Praveen, Bangalore (IN); Alok Das, Pune (IN)

(72) Inventors: Vijay K Praveen, Bangalore (IN); Alok Das, Pune (IN); Lakshmish Gangadhar, Bangalore (IN); Nitin Ranade, Pune (IN)

(*) Notice: Subject to any disclaimer, the term of this patent is extended or adjusted under 35 U.S.C. 154(b) by 143 days.

(21) Appl. No.: 17/611,186

(22) PCT Filed: May 15, 2020

(86) PCT No.: PCT/IN2020/050443
§ 371 (c)(1),
(2) Date: Nov. 15, 2021

(87) PCT Pub. No.: WO2020/230170
PCT Pub. Date: Nov. 19, 2020

(65) Prior Publication Data
US 2022/0204120 A1      Jun. 30, 2022

(30) Foreign Application Priority Data

May 15, 2019  (IN) .............................. 201941019378

(51) Int. Cl.
*B62K 21/18* (2006.01)
*B62K 5/08* (2006.01)
(Continued)

(52) U.S. Cl.
CPC ................ *B62K 21/18* (2013.01); *B62K 5/08* (2013.01); *B62K 21/04* (2013.01); *B62K 7/04* (2013.01)

(58) Field of Classification Search
CPC .......... B62K 21/18; B62K 5/08; B62K 21/04; B62K 7/04; B62K 5/10; B62K 21/00
See application file for complete search history.

(56) References Cited

U.S. PATENT DOCUMENTS

2021/0061398 A1* 3/2021 Rasche .................... B62K 7/02
2021/0331764 A1* 10/2021 Wang ......................... B62J 1/08
(Continued)

FOREIGN PATENT DOCUMENTS

DE        202014003119 U1    8/2014
WO           2018225084 A1   12/2018

*Primary Examiner* — Paul N Dickson
*Assistant Examiner* — Shams Dhanani
(74) *Attorney, Agent, or Firm* — Jose Cherson Weissbrot

(57) ABSTRACT

A steering mechanism for a vehicle, the vehicle comprising a cargo hold chassis (10), communicably coupled with a front wheel (10a) located on a front axle; and a rider and pillion support chassis (20), communicably coupled with a rear wheel (12a) located on a rear axle; wherein, the cargo hold chassis (10) is located operatively forward and operatively lower with respect to the rider support chassis (20); the mechanism comprising: a steering mechanism comprising a steering stem (30), a steering column rod (36), and a steering handle (32), the steering stem (30) mounted in an operative front of the cargo hold chassis (10), the steering handle (32) mounted operatively atop the cargo hold chassis (10); the steering column rod (36) mounted operatively connected to the steering stem (30) at its upper end, the steering stem (30) spaced apart from the steering handle (32) in order to provide for off-center steering.

14 Claims, 10 Drawing Sheets

(51) Int. Cl.
 *B62K 7/04* (2006.01)
 *B62K 21/04* (2006.01)

(56) References Cited

U.S. PATENT DOCUMENTS

2022/0144369 A1* 5/2022 Praveen .................... B62J 1/08
2022/0161885 A1* 5/2022 Praveen ................ B62K 11/04
2022/0234675 A1* 7/2022 Song ........................ B62K 5/08

* cited by examiner

STEERING MECHANISM FOR A VEHICLE

FIELD OF THE INVENTION

This invention relates to the field of automobiles.

Particularly, this invention relates to a steering mechanism for a vehicle.

BACKGROUND OF THE INVENTION

Freight bicycles, carrier cycles, freight tricycles, cargo bikes, box bikes, or cycle-trucks are human powered vehicles designed and constructed specifically for transporting loads.

Prior art vehicle designs include a cargo area consisting of an open or enclosed box, a flat platform, or a wire basket, usually mounted over one or both wheels, low behind the front wheel, or between parallel wheels at either the front or rear of the vehicle. Typically, this cargo area is randomly placed and does not work well with the vehicle's maneuverability since a variety of moments act on these randomly aligned vehicles; especially while taking turns, causing dangerous as well as difficult maneuvers.

Freight bikes are used in a variety of settings:
Delivery services in dense urban environments;
Food vending in high foot traffic areas (including specialist ice cream bikes);
Transporting trade tools, including around large installations such as power stations and CERN;
Airport cargo handling;
Recycling collections;
Warehouse inventory transportation;
Mail delivery.

These freight bikes are human powered and cannot be used for carrying heavy weight and are also slow due to human effort needed.

Also in all the above examples, the Loading is carried out at higher location, thereby shifting the CG higher which impacts the handling and dynamics of the vehicle.

Furthermore, in all prior art two-wheeled vehicles, there is no dedicated cargo compartment for carrying load. Even if there is, in one type of modified two-wheeled vehicles, the load is at a relatively higher location when considered with the natural centre of gravity of the vehicle (without the modification to carry load), which effectively raises the centre of gravity to a dangerous height making the vehicle (when loaded with rider and load) wobbly and difficult to balance and steer. Additionally, if the load/cargo is kept behind the rider, it almost always rests against the back of the rider, thereby restricting backward movement of the rider and causing tremendous strain on the rider's back. In another type of modified two-wheeled vehicles, the load is at an operative forward location when compared with the rider. This effectively moves the centre of gravity way too ahead with respect to a rider and with respect to the entire loaded vehicles, as a whole, making maneuverability difficult. It is, therefore, important that the centre of gravity be located within a defined zone such that there is no wobbling or misbalancing of the vehicle when it is being ridden, there is ample space for a rider to move his or her body to adjust centre of gravity when riding the vehicle, there is ease of maneuverability, there is no learning curve, and the like.

Therefore, a vehicle or a class of vehicle, is designed, in order to make cargo carrying, especially, at last mile, easy and efficient, such vehicle or class of vehicle, preferably, being a two-wheeler vehicle. This vehicle and class of vehicle comprises an unorthodox framework where the a cargo hold chassis is in front of the rider. This framework necessitates that a steering mechanism be displaced from the prior art position where it is collinear with a shaft extending from a front wheel. Since collinearity is lost, handling/steering may prove to be a challenge.

There is, therefore, a need to solve the problems/challenges of this vehicle or class of vehicles.

OBJECTS OF THE INVENTION

An object of the invention is to overcome the current problems involved in handling/steering freight bikes or cargo scooters.

Another object of the invention is to provide ease of handling/steering of freight bikes or cargo scooters even whilst having a large load carrying space in front of a rider and between the rider and a front wheel.

Yet another object of the invention is to provide an easily maneuverable handling/steering mechanism in freight bikes or cargo scooters even whilst having a large load carrying space in front of a rider and between the rider and a front wheel.

Still another object of the invention is to provide a rather stable freight bike or cargo scooter, in terms of handling/steering even whilst having a large load carrying space in front of a rider and between the rider and a front wheel.

SUMMARY OF THE INVENTION

According to this invention, there is provided a steering mechanism for a vehicle, said vehicle comprising a cargo hold chassis, communicably coupled with a front wheel or a front set of wheels, said front wheel(s) located on a front axle; and a rider and pillion support chassis, communicably coupled with a rear wheel or a rear set of wheels, said rear wheel(s) located on a rear axle; wherein, said cargo hold chassis is located operatively forward and operatively lower with respect to said rider and pillion support chassis; said mechanism comprising:

a steering mechanism comprising a steering stem, a steering column rod, and a steering handle, said steering stem being mounted in an operative front of said cargo hold chassis, said steering handle being mounted operatively atop said cargo hold chassis; said steering column rod being mounted operatively connected to said steering stem at its upper end, said steering stem being spaced apart from said steering handle in order to provide for off-centre steering;

said steering mechanism being defined in terms of three axes, in that, an axis about which said steering handle angularly displaces being a handlebar axis (axis-A), an axis about which said steering stem angularly displaces being a steering axis (axis-C), and an axis responsible for translation of motion from said steering handle about said handlebar axis (axis-A) to said steering stem about said steering axis (axis-C) being an intermediate axis (axis-B), characterised in that, said steering axis (axis-C), said intermediate axis (axis-B), and said handlebar axis (axis-A) being substantially coplanar and any angular displacement input about said handlebar axis being translated to said steering axis via said intermediate axis using said steering mechanism;

said handlebar axis (axis-A) being an axis about which said steering handle is angularly displaceable, said intermediate axis (axis-B) being an axis about which said steering column rod is angularly displaceable, and said steering axis (axis-C) being an axis about which said steering stem is angularly displaceable, said steering axis (axis-C) defining a rake angle for said vehicle; and said steering axis (axis-C) being spaced apart from said handlebar axis (axis-A) in order to provide for off-centre steering, said intermediate axis (axis-B) being spaced apart from said handlebar axis (axis-A) in order to provide for off-centre steering, and said steering axis (axis-C) intersecting with said intermediate axis (axis-B).

In at least an embodiment, said steering axis about which said steering stem is located and about which is angularly displaceable being longitudinally spaced apart from said handlebar axis about which said steering handle is located and about which is angularly displaceable.

In at least an embodiment, distance between said handlebar axis and said steering axis being adjustable by a user based on user comfort level that is desired, thereby providing a user adjustable steering.

In at least an embodiment, said system comprising a translation mechanism configured to translate angular displacement about said handlebar axis into angular displacement about said steering axis.

In at least an embodiment, said system comprising a translation mechanism configured to translate angular displacement about said handlebar axis into angular displacement about said steering axis, characterised in that, said translation mechanism being a bevel gear mechanism or a worm gear mechanism.

In at least an embodiment, said steering mechanism is a steer-by-wire steering mechanism, in that, it comprises sensors and motor where said sensors are located at said steering handle axis and are configured to sense force and/or angular displacement of said steering handle about said handlebar axis (axis-A) and said motor being configured to angularly displace said steering stem (axis-C) in response and in correlation with said sensed force and/or angular displacement of said steering handle.

In at least an embodiment, said steering mechanism is defined in terms of three axes, in that, an axis about which said steering handle angularly displaces being a handlebar axis (axis-A), an axis about which said steering stem angularly displaces being a steering axis (axis-C), and an axis about responsible for translation of motion from said steering handle about said handlebar axis (axis-A) to said steering stem about said steering axis (axis-C) being an intermediate axis (axis-B), characterised in that, a velocity joint being provided at the intersection of said steering axis and said intermediate axis.

In at least an embodiment, said steering mechanism is defined in terms of three axes, in that, an axis about which said steering handle angularly displaces being a handlebar axis (axis-A), an axis about which said steering stem (30) angularly displaces being a steering axis (axis-C), and an axis about responsible for translation of motion from said steering handle (32) about said handlebar axis (axis-A) to said steering stem (30) about said steering axis (axis-C) being an intermediate axis (axis-B), characterised in that, an angle between said handlebar axis and said steering axis being greater than 0 degrees.

In at least an embodiment, said steering mechanism is defined in terms of three axes, in that, an axis about which said steering handle angularly displaces being a handlebar axis (axis-A), an axis about which said steering stem angularly displaces being a steering axis (axis-C), and an axis about responsible for translation of motion from said steering handle about said handlebar axis (axis-A) to said steering stem about said steering axis (axis-C) being an intermediate axis (axis-B), characterised in that, said handlebar axis and said steering axis being parallel to each other.

In at least an embodiment, said steering mechanism is defined in terms of three axes, in that, an axis about which said steering handle angularly displaces being a handlebar axis (axis-A), an axis about which said steering stem angularly displaces being a steering axis (axis-C), and an axis about responsible for translation of motion from said steering handle about said handlebar axis (axis-A) to said steering stem about said steering axis (axis-C) being an intermediate axis (axis-B), characterised in that, said steering axis and said intermediate axis being concentric and parallel to said handlebar axis.

In at least an embodiment, said steering mechanism is defined in terms of three axes, in that, an axis about which said steering handle angularly displaces being a handlebar axis (axis-A), an axis about which said steering stem angularly displaces being a steering axis (axis-C), and an axis about responsible for translation of motion from said steering handle about said handlebar axis (axis-A) to said steering stem about said steering axis (axis-C) being an intermediate axis (axis-B), characterised in that, said steering axis and said intermediate axis being concentric and at an angle greater than 0 degrees to said handlebar axis.

In at least an embodiment, said steering handle is connected and concentric with a first V-link, said first V-link being connected to a second V-link via at least one link.

In at least an embodiment, said steering handle is connected and concentric with a first V-link, said first V-link being connected to a second V-link via at least one steering rod link, characterised in that, said steering rod link being a link selected from a solid link or a flexible link.

In at least an embodiment, said steering handle is connected and concentric with a first V-link, said first V-link being connected to a second V-link via at least one link, characterised in that, said second V-link being concentric to said intermediate axis (axis-B) for translation of motion, said second V-link being aligned to said intermediate axis (axis-B), and said second V-link being aligned to a steering column rod, located above said steering stem, and angularly displaceable about an intermediate axis (axis-B).

In at least an embodiment, said steering handle is connected and concentric with a first V-link, said first V-link being connected to a second V-link via at least one link, characterised in that, a steering column rod located operatively atop said steering stem, said steering column rod being connected to a triple tree via a velocity joint for translation of angular displacement motion from said steering handle to a front wheel or to a front set of wheels.

In at least an embodiment, angular displacement, of said steering handle is made variable by means of a bar linkage mechanism, angular displacement is made variable by means of different radii of angular displacement as per a first V-Link and a second V-link.

In at least an embodiment, angular displacement, of said steering handle is made variable by means of a bar linkage mechanism, angular displacement is made variable by means of different radii of angular displacement as per a first V-Link and a second V-link, wherein,
  a first distance defined by a first point defined by a point about which said steering handle angularly displaces and a second point defined by a locus of points equidistant from said first point, said second point being equal to a point of said first V-link where it connects to at least a steering rod link extending towards said steering stem;

a second distance defined by a third point defined by a point about which said steering column rod angularly displaces and a fourth point defined by a locus of points equidistant from said third point, said fourth point being equal to a point of said second V-link where it connects to at least a steering rod link extending towards said steering handle, characterised in that, for 1:1 angular displacement translation from said handlebar axis (axis-A) to said intermediate axis (axis-B), said first distance being equal to said second distance.

In at least an embodiment, angular displacement, of said steering handle is made variable by means of a bar linkage mechanism, angular displacement is made variable by means of different radii of angular displacement as per a first V-Link and a second V-link, wherein, a first distance defined by a first point defined by a point about which said steering handle angularly displaces and a second point defined by a locus of points equidistant from said first point, said second point being equal to a point of said first V-link where it connects to at least a steering rod link extending towards said steering stem;

a second distance defined by a third point defined by a point about which said steering column rod angularly displaces and a fourth point defined by a locus of points equidistant from said third point, said fourth point being equal to a point of said second V-link where it connects to at least a steering rod link extending towards said steering handle, characterised in that, for oversteering angular displacement translation from said handlebar axis (axis-A) to said intermediate axis (axis-B), said first distance being greater than said second distance.

In at least an embodiment, angular displacement, of said steering handle is made variable by means of a bar linkage mechanism, angular displacement is made variable by means of different radii of angular displacement as per a first V-Link and a second V-link, wherein, a first distance defined by a first point defined by a point about which said steering handle angularly displaces and a second point defined by a locus of points equidistant from said first point, said second point being equal to a point of said first V-link where it connects to at least a steering rod link extending towards said steering stem;

a second distance defined by a third point defined by a point about which said steering column rod angularly displaces and a fourth point defined by a locus of points equidistant from said third point, said fourth point being equal to a point of said second V-link where it connects to at least a steering rod link extending towards said steering handle, characterised in that, for understeering angular displacement translation from said handlebar axis (axis-A) to said intermediate axis (axis-B), said first distance being lesser than said second distance.

In at least an embodiment, angular displacement, of said steering handle is made variable by means of a rack and pinion linkage mechanism, angular displacement is made variable by different gear sizes, a first gear at said handlebar axis (axis-A), a second gear at said intermediate axis (axis-B), said first gear connected to said second gear by means of a rack gear which slides to transfer angular displacement of said handlebar axis (axis-A) to said intermediate axis (axis-B).

In at least an embodiment, angular displacement, of said steering handle is made variable by means of a rack and pinion linkage mechanism, angular displacement is made variable by different gear sizes, a first gear at said handlebar axis (axis-A), a second gear at said intermediate axis (axis-B), said first gear connected to said second gear by means of a rack gear which slides to transfer angular displacement of said handlebar axis (axis-A) to said intermediate axis (axis-B), characterised in that, for 1:1 angular displacement translation from said handlebar axis (axis-A) to said intermediate axis (axis-B), said first gear's diameter being equal to said second gear's diameter.

In at least an embodiment, angular displacement, of said steering handle is made variable by means of a rack and pinion linkage mechanism, angular displacement is made variable by different gear sizes, a first gear at said handlebar axis (axis-A), a second gear at said intermediate axis (axis-B), said first gear connected to said second gear by means of a rack gear which slides to transfer angular displacement of said handlebar axis (axis-A) to said intermediate axis (axis-B), characterised in that, for oversteering angular displacement translation from said handlebar axis (axis-A) to said intermediate axis (axis-B), said first gear's diameter being greater than said second gear's diameter.

In at least an embodiment, angular displacement, of said steering handle is made variable by means of a rack and pinion linkage mechanism, angular displacement is made variable by different gear sizes, a first gear at said handlebar axis (axis-A), a second gear at said intermediate axis (axis-B), said first gear connected to said second gear by means of a rack gear which slides to transfer angular displacement of said handlebar axis (axis-A) to said intermediate axis (axis-B), characterised in that, for understeering angular displacement translation from said handlebar axis (axis-A) to said intermediate axis (axis-B), said first gear's diameter being lesser than said second gear's diameter.

BRIEF DESCRIPTION OF THE ACCOMPANYING DRAWINGS

The invention will now be described in relation to the accompanying drawings, in which.

DETAILED DESCRIPTION OF THE ACCOMPANYING DRAWINGS

According to this invention, there is provided a steering mechanism for a vehicle.

Figure 1:
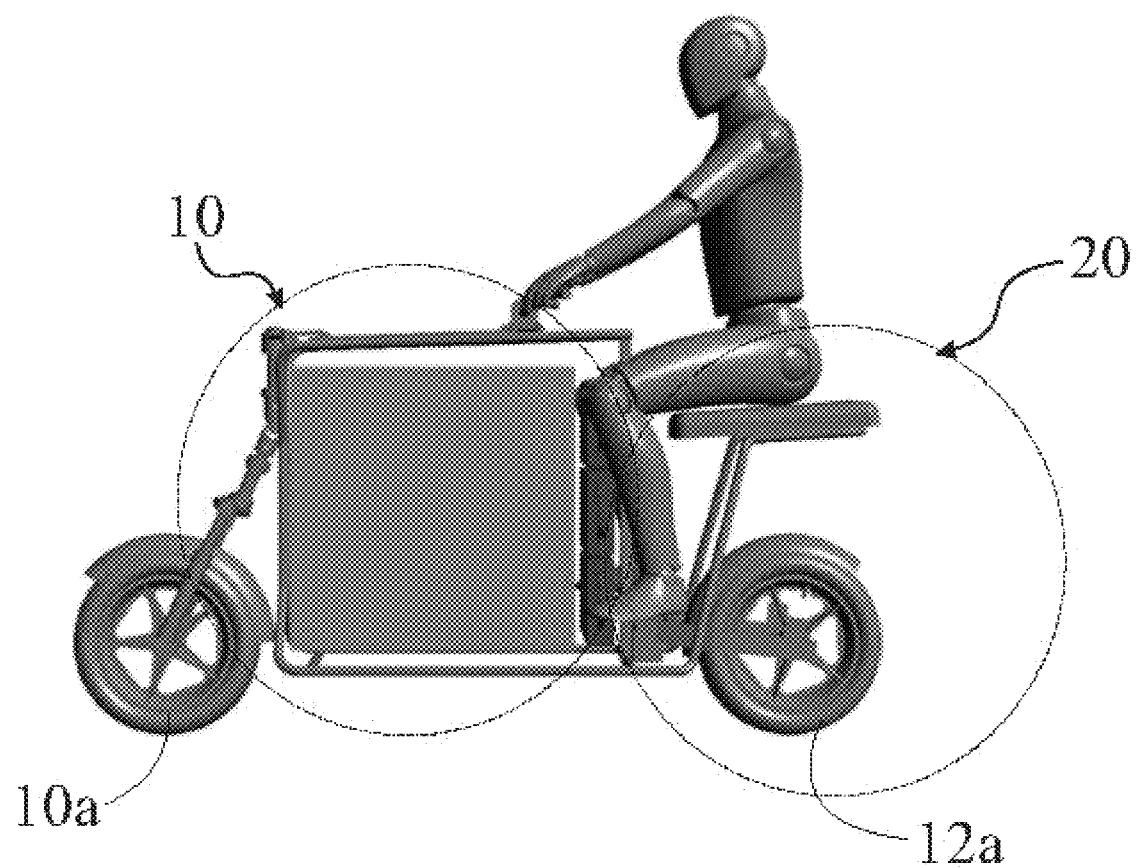
FIG. 1 illustrates a side view of the cargo-carrying vehicle along with rider.

FIG. 1 illustrates a side view of the cargo-carrying vehicle along with rider.

The vehicle is designed to provide a solution for the last mile delivery which is presently carried out using existing scooters or motorcycles which are not functionally and ergonomically designed for the last mile delivery. The vehicle is specifically designed to carry cargo so that users can conveniently transport items such as groceries, children, food deliveries, warehouse items, etc. At the same time, through its simple cargo-focused design, the vehicle offers more utility for local transportation needs, at far less cost, with less maintenance than existing bicycles, tricycles, and kick scooters.

In at least an embodiment, this vehicle is defined in terms of at least a cargo hold chassis (10) and at least a rider and pillion support chassis (20). The limitations of the prior art are addressed by the geometries of the cargo hold chassis and the rider and pillion support chassis. It is a desired objective of this invention to provide a structural framework in which the cargo hold chassis (10) and the rider and pillion support chassis (20) cooperate to maintain centre of gravity of the vehicle, especially after addition of cargo (along with battery) and rider, relatively lower (closer to ground) and substantially on or very near to the centerline of the wheelbase of this vehicle (between 10a and 12a).

In at least an embodiment, the cargo hold chassis (10) comprises a structural framework which, essentially, holds a cargo within the structural framework. This cargo hold chassis is located operatively forward and operatively lower with respect to the rider and pillion support chassis. The cargo hold chassis comprises at least a lateral support member (i.e. front and back support member) along with an operative top support member and an operative bottom support member to form a contoured space to hold cargo. In one of the embodiments, any single or any combination of these support members can hold battery packs which are communicably coupled to the drive of this vehicle. The cargo hold chassis, typically, is communicably coupled with a front wheel (10a) or a front set of wheels. The front wheel is located on a front axle communicably coupled to a steering mechanism.

In one other embodiment, the cargo hold chassis is defined such that an operative front half of this cargo hold chassis is made relatively heavier and an operative rear half of this cargo hold chassis is made relatively lighter for mass centralization. In this case, when a rider is seated on the rider and pillion support chassis, the entire vehicle is in a balanced configuration.

In at least an embodiment, the rider and pillion support chassis (20) comprises a structural framework which, essentially, holds a rider on the structural framework. This rider and pillion support chassis is located operatively rearward with respect to the cargo hold chassis. The rider and pillion support chassis comprises at least a lateral support member (i.e. front and back support member) along with an operative top support member and an operative bottom support member to form a contoured framework to hold a rider on its top support member. In one of the embodiments, any single or any combination of these support members can hold battery packs which are communicably coupled to the drive of this vehicle. The rider and pillion support chassis, typically, is communicably coupled with a rear wheel (12a) or a rear set of wheels. The rear wheel is located on a rear axle. The top support member of the rider and pillion support chassis is located at a height such that the rider, when seated, has his individual centre of gravity operatively higher than the individual centre of gravity of the cargo load.

In one embodiment, the back lateral support member of the cargo hold chassis and the front lateral support member of the rider and pillion support chassis is a single same member.

In at least an embodiment of a steering mechanism of this vehicle and invention, a steering stem (30) is mounted in the operative front of the cargo hold chassis. The steering stem (30) angularly displaces upon input from a steering column rod (36) in order to correspondingly angularly displace the connected front wheel. A steering column may envelope such steering stem (30). The axis of the steering mechanism is coplanar with the front suspension axis. The steering stem (30) is spaced apart from a steering handle and the axis about which the steering handle is located in order to provide for off-centre steering. The cargo hold chassis comprises a swing arm pivot for mounting a swing arm and at least one mounting location for the suspension mounts.

The axis of the steering handle can be parallel to the steering stem axis or at an angle to the steering stem axis.

Distance along an X-direction between the handlebar axis (axis-A) and axis-C can also be adjusted by a user based on user comfort level that is desired. This provides a feature of user adjustable steering.

In at least an embodiment, the steering handle (32) of this vehicle is located longitudinally spaced apart from the steering axis. Preferably, the steering mechanism is a—bar linkage mechanism or a rack and pinion mechanism or a bevel gear mechanism or a worm gear mechanism. This steering mechanism is located operatively atop the cargo hold chassis (10). Damping effect on the steering mechanism can be carried out by means of shimmy dampers—mechanical, pneumatic, magnetic, or hydraulic type.

In at least an embodiment, the steering mechanism is a steer-by-wire steering mechanism or a power steering mechanism. In at least an embodiment, the steering mechanism comprises sensors and motors where the sensors are located at the handlebar axis (axis-A). The steering handle rotation about its axis is monitored by sensors, which reads the rotational degrees of movement and/or force on steering handle by the rider input. A motor is located in communication with the front wheel of this vehicle either directly driving the steering or by use of gearing. A controller monitors the rider's inputs and provides inputs to the motor for turning the vehicle steering. Any handle movement is captured and replicated at the front wheel(s) through this steering mechanism.

Figure 2:
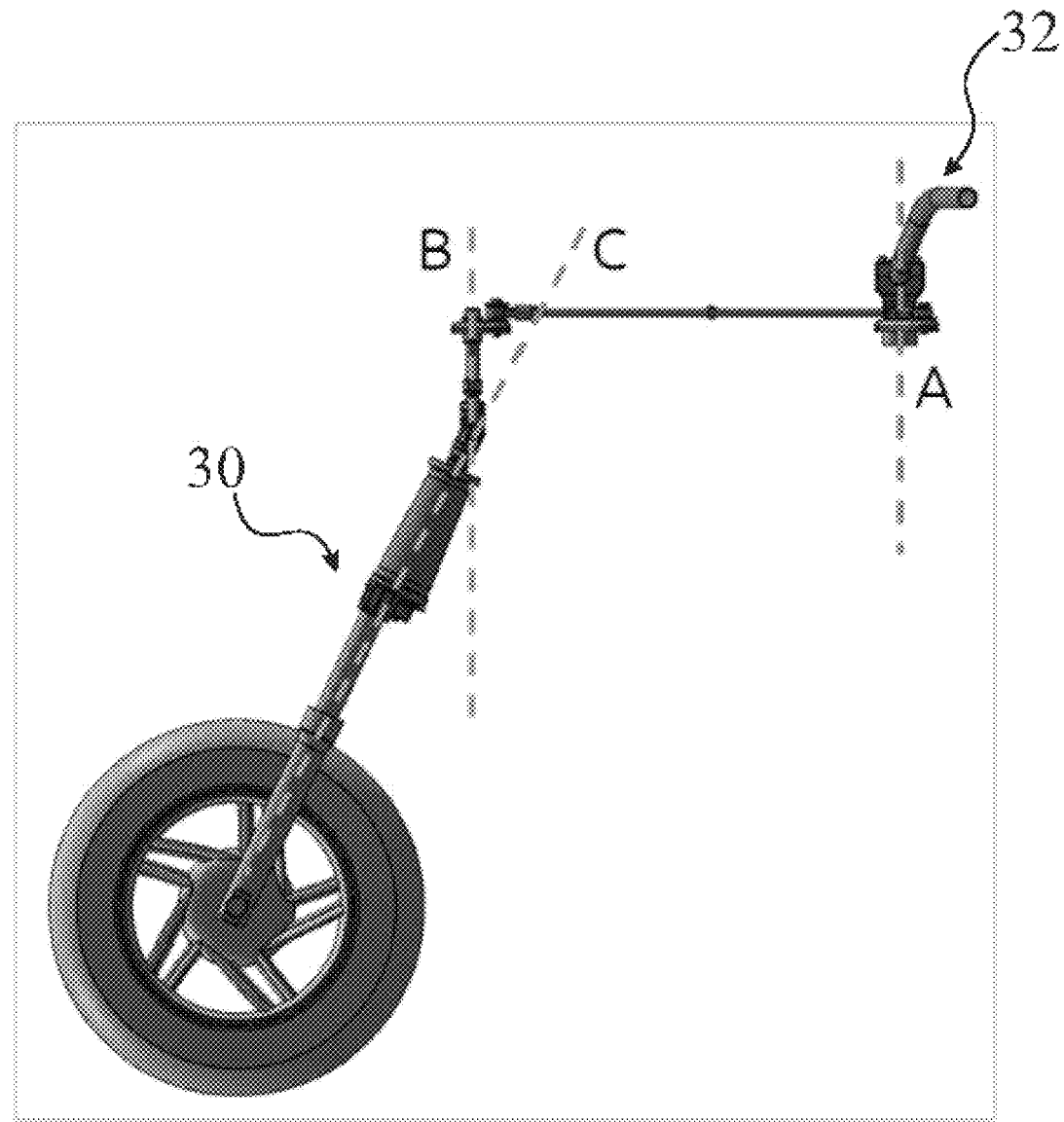
FIG. 2 illustrates a motion translation mechanism for a two-wheeled/three-wheeled vehicle where motion about axis-A is translated to motion about axis-C.

FIG. 2 illustrates a motion translation mechanism for a two-wheeled/three-wheeled vehicle where motion about axis-A is translated to motion about axis-C; since, the steering handle (32) is spaced apart from the steering stem (30).

For the purposes of this invention and specification, axis-A is defined as a handlebar axis (axis-A) about which the steering handle angularly displaces, axis-B is defined as an intermediate axis responsible for translation of motion, and axis-C is defined as a steering axis. In at least an embodiment, at the intersection of axis-B and axis-C, a velocity joint (34) is positioned.

In one embodiment, the angle between axis-A and axis-C is greater than 0 degrees. In another embodiment, the axis-A and axis-C are parallel to each other. In yet another embodiment, the axis-A and Axis-B are parallel to each other but at an angle to Axis-C. In still another embodiment, the axis-C and axis-B are parallel to each other (not shown). In yet another embodiment, the axis-C and axis-B are concentric and parallel to axis-A (not shown). In still another embodiment, the axis-C and axis-B are concentric and at an angle greater than 0 Degrees to axis-A. In yet another embodiment, axis-B is not needed and only axis-A and axis-C are linked with the mechanism.

In an embodiment, if the axis-B and the axis-C is concentric, the need for a velocity joint may be obviated.

In an embodiment, axis-A, axis-B, and axis-C are connected using the mechanism described below. Any rotary (angular displacement) input to axis-A gets translated to axis-C via axis-B using this mechanism. Any rotary (angular displacement) input to axis-C gets translated to axis-A via axis-C, using this mechanism.

Reference numeral 31 refers to front suspension.

Reference numeral 33 refers to triple tree.

In at least an embodiment, the steering column rod (36) is concentric with axis-B.

Figure 3:
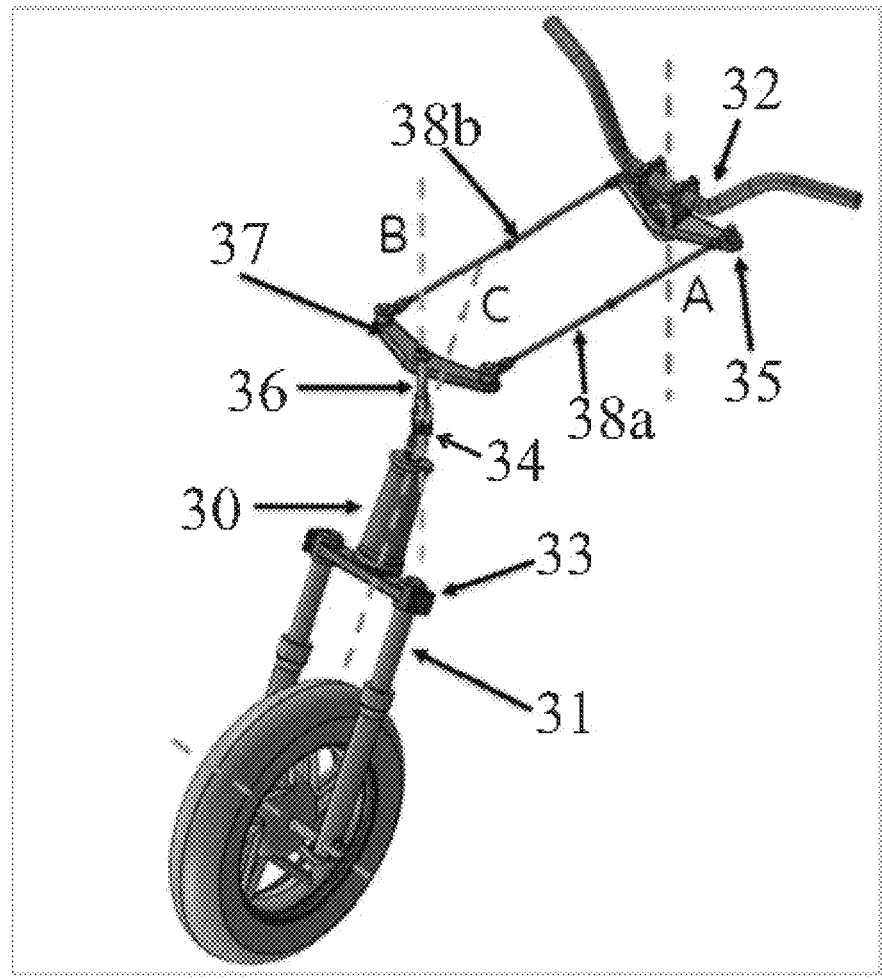
FIG. 3 illustrates one embodiment of the entire mechanism of this cargo-carrying vehicle.

FIG. 3 illustrates one embodiment of the entire mechanism of this invention. The handlebar axis (axis-A) is concentric to a first V-link (35). The first V-link (35) is connected to a second V-link (37) via at least one steering rod link (38a, 38b). This link could be a solid link or a flexible cable or the like. The second V-Link is concentric to the Axis-B for translation of motion. The second V-Link is also aligned to the steering column rod (36) defined by axis-B. The steering column rod (36) defined by axis-B is connected to the triple tree (33) via a velocity joint (34) which is used for translation of rotary (angular displacement) motion from the steering handle (32) to a front wheel (10a) or to a front set of wheels. The translation of motion is used for maneuvering the vehicle.

In at least an embodiment, the second V-link (37) is aligned to the intermediate axis (axis-B), and the second V-link (37) being aligned to the steering column rod (36), located above the steering stem (30), and angularly displaceable about the intermediate axis (axis-B)

Figure 4:
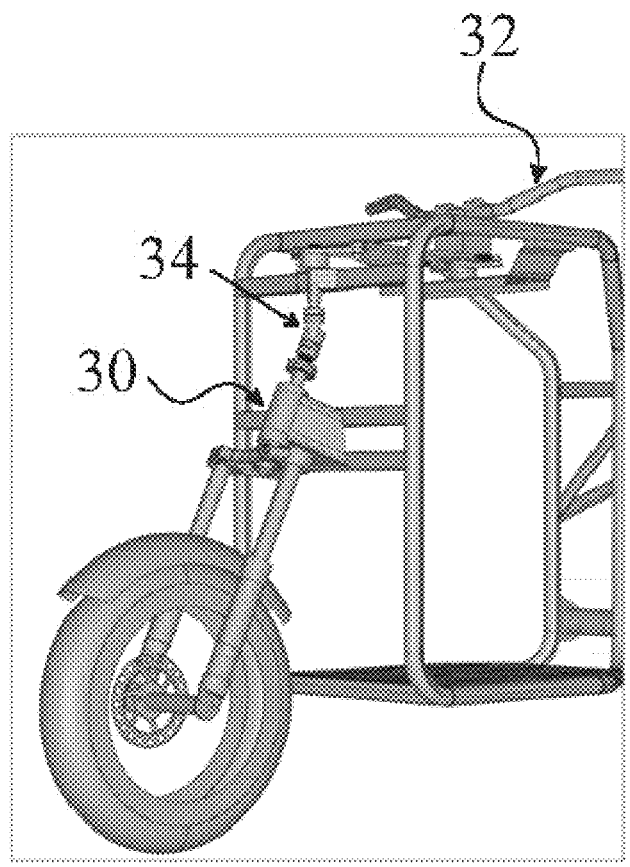
FIG. 4 illustrates a perspective view of the steering mechanism of this cargo-carrying vehicle.

FIG. 4 illustrates a perspective view of the steering mechanism of this invention with a portion of the chassis of the vehicle and with a front wheel of this vehicle.

Figure 5:
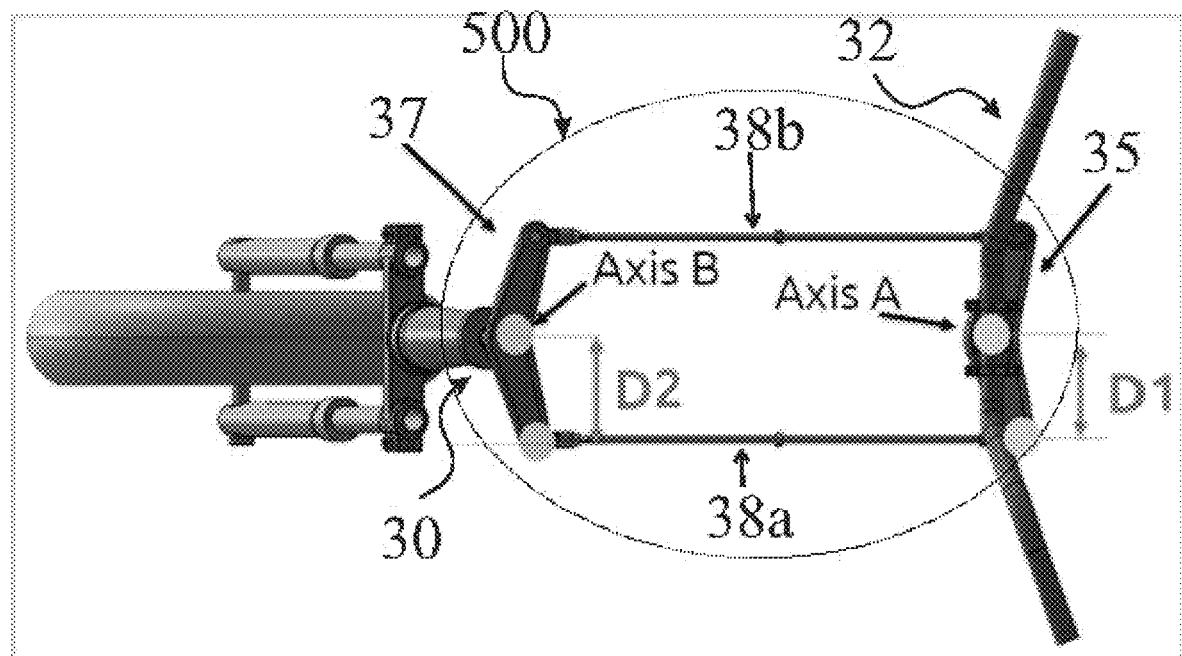
FIG. 5 illustrates another embodiment of the entire mechanism of this cargo-carrying vehicle.

FIG. 5 illustrates another embodiment of the entire mechanism of this invention, where angular displacement, of the steering handle (32), is made variable by means of a first defined mechanism (500) which is a bar linkage mechanism.

In the embodiment, as illustrated by FIG. 5, a first distance (D1) defined by a first point defined by a point about which said steering handle (32) angularly displaces and a second point defined by a locus of points equidistant from said first point, said second point being equal to a point of said first V-link (35) where it connects to at least a steering rod link (38a, 38b) extending towards said steering stem (30).

In the embodiment, as illustrated by FIG. 5, a second distance (D2) defined by a third point defined by a point about which said steering column rod (36) angularly displaces and a fourth point defined by a locus of points equidistant from said third point, said fourth point being equal to a point of said second V-link (37) connecting said steering column rod (36) where it connects to at least a steering rod link (38a, 38b) extending towards said steering handle (32).

In at least an embodiment of this first defined mechanism, angular movement is made variable by means of different radii (D1, D2) of angular displacement per V-Link (35, 37).

For 1:1 angular displacement translation from axis-A to axis-B, D1=D2.

For oversteering angular displacement translation from axis-A to axis-B, D1>D2.

For understeering angular displacement translation from axis-A to axis-B, D1<D2Y.

Similarly, for any ratio of angular translation between axis-A and axis-B, D1 and D2 can be varied to get a desired output. The angular displacement translation could be achieved by use of at least one link connecting the first V-Link (35) and the second V-Link (37).

Figure 6:
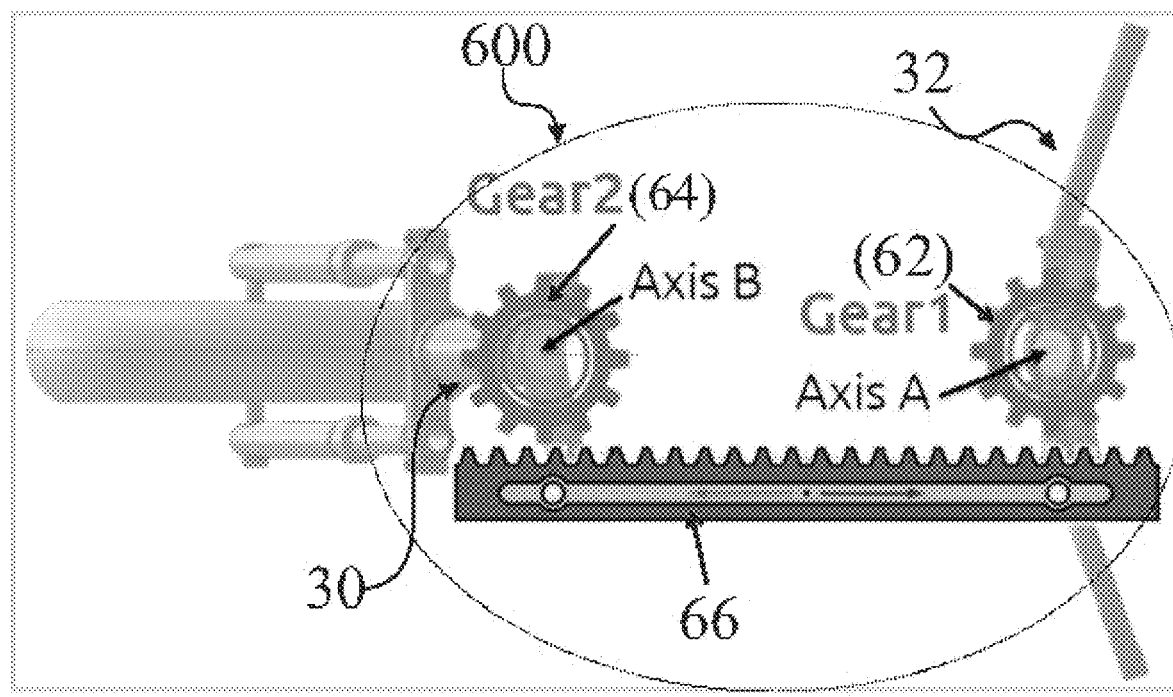
FIG. 6 illustrates another embodiment of the entire mechanism of this cargo-carrying vehicle.

FIG. 6 illustrates another embodiment of the entire mechanism of this invention, where angular displacement, of the steering handle (32), is made variable by means of a second defined mechanism (600) which is a rack and pinion linkage mechanism (600).

In at least an embodiment of this second defined mechanism, the angular displacement is made variable by use of different gear sizes at axis-A and axis-B. The gears (62, 64) are connected by use of a rack gear (66) which slides to transfer the angular movement of axis-A to axis-B.

For 1:1 angular displacement translation from axis-A to axis-B, gear 1 diameter=Gear 2 diameter.

For oversteering angular displacement translation from axis-A to axis-B, gear 1 diameter>gear 2 diameter.

For understeering angular displacement translation from axis-A to axis-B, gear 1 diameter<gear 2 diameter. The angular displacement translation could be achieved by use of at least 1 rack gear connecting gear 1 and gear 2.

Figure 7:
FIG. 7 illustrates a steering stem of this cargo-carrying vehicle with a velocity joint.

FIG. 7 illustrates a steering stem of this invention with the velocity joint (34). The velocity joint (34) could be of following type: Hobson's joint, Universal Joint, Tracta joints, Rzeppa joints, Weiss joints, Bendix-Weiss, Tripod joints, Double Cardan, Thompson coupling, Malpezzi joints, or any similar velocity joints known in the art.

In yet another embodiment, the velocity (34) joint is replaced by bevel or worm gear or any other contemporary gear arrangement for having variable gear ratio.

Reference numeral 71 refers to a collar on the steering stem.

Figure 8:
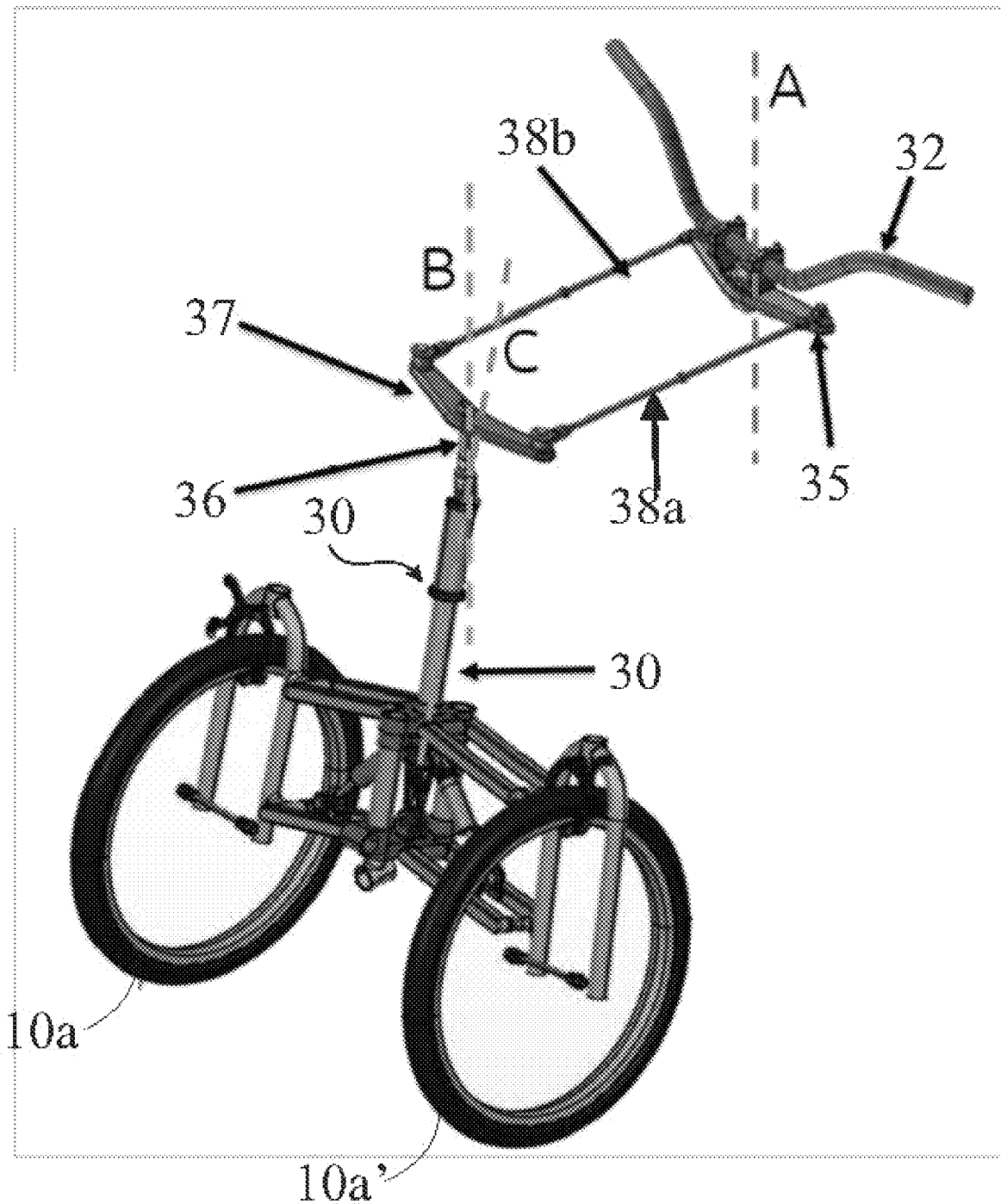
FIG. 8 illustrates a motion translation mechanism of this cargo-carrying vehicle.

FIG. 8 illustrates a motion translation mechanism of this invention.

A motion translation mechanism for front two wheels is shown where motion about axis-A is translated to motion about axis-C. Axis-A, axis-B, and axis-C are connected using a mechanism described below. Any rotary (angular displacement) input to axis-A gets translated to axis-C via axis-B, using this mechanism. Any rotary (angular displacement) input to axis-C gets translated to axis-A via axis-B, using this mechanism. The steering handle's (32) axis-A is concentric to a first V-Link (35). The first V-Link (35) is connected to second V-Link (37) via at least a steering rod link (38a, 38b). This link could be a solid link or a flexible cable or the like. The second V-Link (37) is concentric to axis-B for translation of motion. The second V-Link (37) is also aligned to the steering column rod (36) axis-B. The steering column rod (36) axis-B is connected to a triple tree via a velocity joint which is used for translation of rotary (angular displacement) motion from steering handle (32) till front wheel(s). The translation of motion is used for maneuvering the vehicle.

Figure 9:
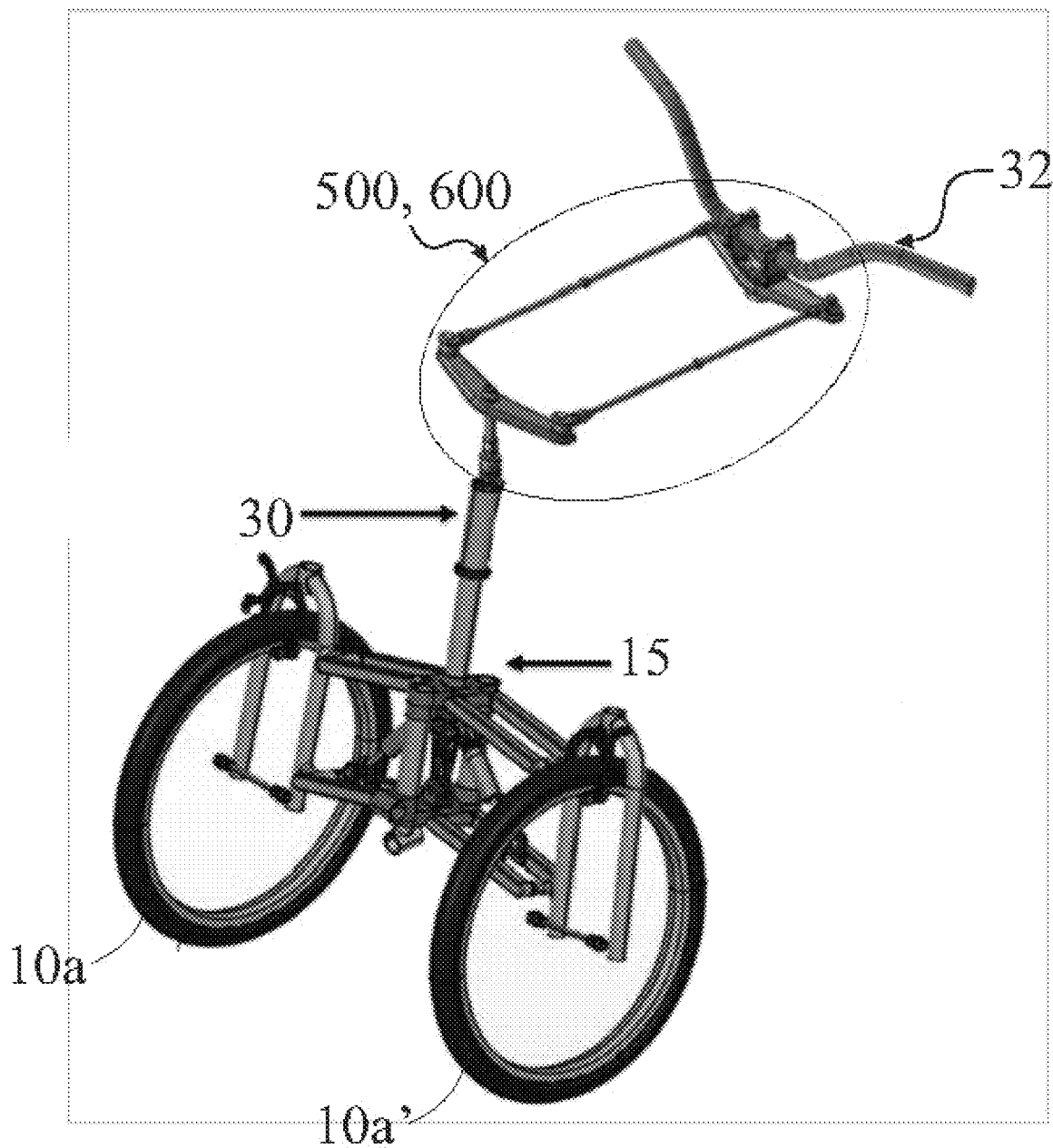
FIG. 9 illustrates the steering mechanism of this cargo-carrying vehicle for a three-wheeled vehicle.

FIG. 9 illustrates the steering mechanism of this invention for a three-wheeled vehicle.

The front two wheels (10a, 10a'), in front, have corresponding independent suspensions (15), on each wheel, which allows the vehicle to tilt during turning or banking. The front two wheels also are independent to move over two different road surfaces.

Figure 10:
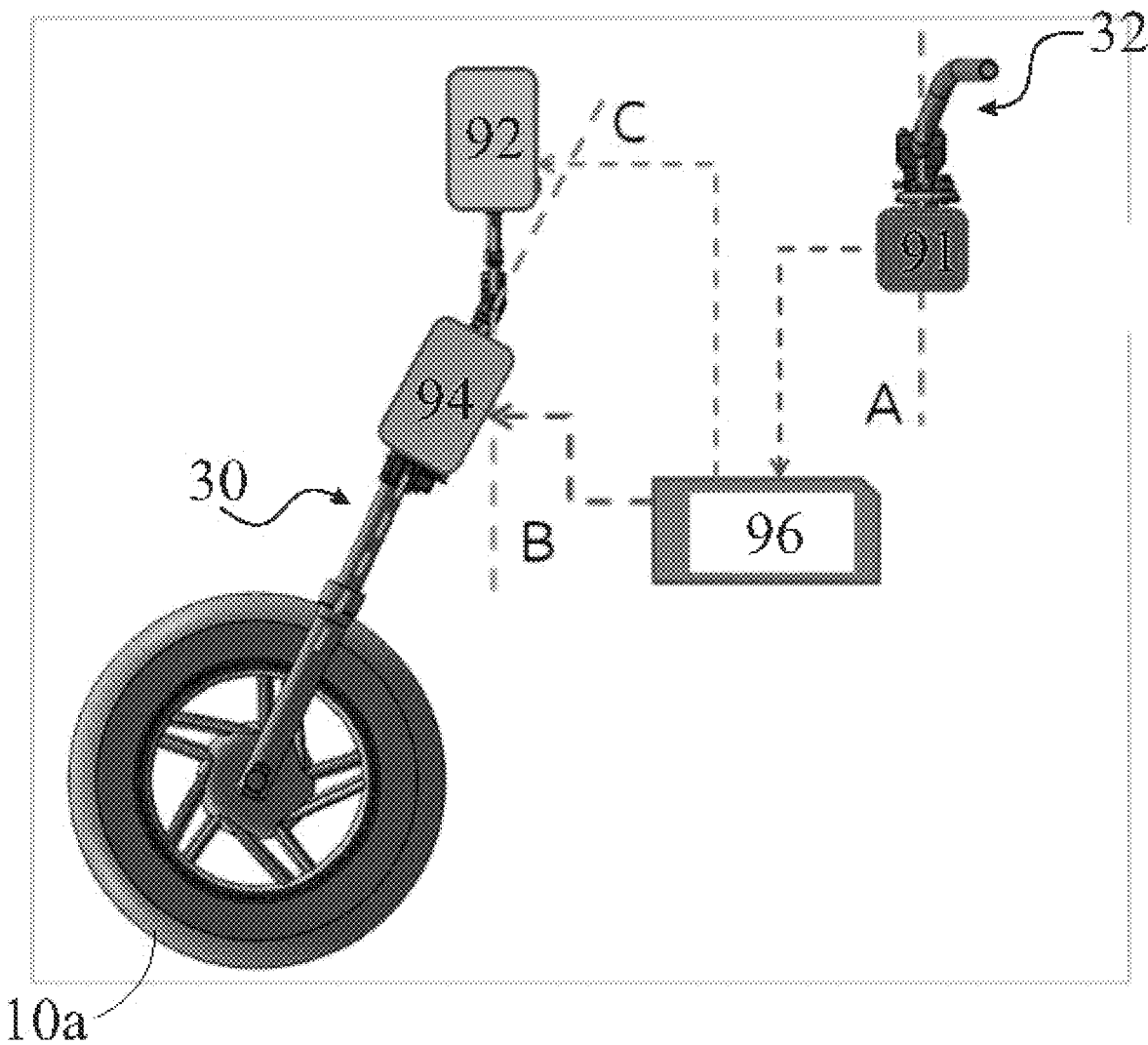
FIG. 10 illustrates a remote steering mechanism of this cargo-carrying vehicle.

FIG. 10 illustrates a remote steering mechanism of this invention.

In another embodiment, a remote steering mechanism for two-three wheeled vehicles is described.

An angle sensor (91) is located at axis-A which measures angular input at the steering handle (32) along axis-A. A motor output is aligned or linked to either axis-B or axis-C directly or via a gear mechanism. A first motor (92) or a second motor (94) receives a command from a control unit (95) based on the angular input and/or force input received from the steering handle (32) mounted angle sensor (91).

The TECHNICAL ADVANCEMENT of this invention lies in providing a steering mechanism which provides for ease of maneuverability, without necessitating a learning curve, in vehicles where a steering handle bar is spaced apart from a steering stem of a wheel of the vehicle.

While this detailed description has disclosed certain specific embodiments for illustrative purposes, various modifications will be apparent to those skilled in the art which do not constitute departures from the spirit and scope of the invention as defined in the following claims, and it is to be distinctly understood that the foregoing descriptive matter is to be interpreted merely as illustrative of the invention and not as a limitation.

What is claimed is:

1. A steering mechanism for a vehicle, said vehicle comprising a cargo hold chassis (10), communicably coupled with a front wheel (10a) or a front set of wheels, said front wheel(s) located on a front axle; and a rider and pillion support chassis (20), communicably coupled with a rear wheel (12a) or a rear set of wheels, said rear wheel(s) located on a rear axle; wherein, said cargo hold chassis (10) is located operatively forward and operatively lower with respect to said rider and pillion support chassis (20); said steering mechanism located operatively atop the cargo hold chassis (10), and comprising:
   a steering stem (30), a steering column rod (36), and a steering handle (32), said steering stem (30) being mounted in an operative front of said cargo hold chassis (10), said steering handle (32) being mounted operatively atop said cargo hold chassis (10); said steering column rod (36) being mounted operatively connected to said steering stem (30) at its upper end, said steering stem (30) being spaced apart from said steering handle (32) in order to provide for off-centre steering;
   said steering mechanism being defined in terms of three axes, in that, an axis about which said steering handle (32) angularly displaces being a handlebar axis (axis-A), an axis about which said steering stem (30) angularly displaces being a steering axis (axis-C), and an axis responsible for translation of motion from said steering handle (32) about said handlebar axis (axis-A) to said steering stem (30) about said steering axis (axis-C) being an intermediate axis (axis-B), wherein, said steering axis (axis-C), said intermediate axis (axis-B), and said handlebar axis (axis-A) being substantially coplanar and any angular displacement input about said handlebar axis being translated to said steering axis via said intermediate axis using said steering mechanism; said handlebar axis (axis-A) being an axis about which said steering handle is angularly displaceable, said intermediate axis (axis-B) being an axis about which said steering column rod is angularly displaceable, and said steering axis (axis-C) being an axis about which said steering stem is angularly displaceable, said steering axis (axis-C) defining a rake angle for said vehicle; and
   said steering axis (axis-C) being spaced apart from said handlebar axis (axis-A) in order to provide for off-centre steering, said intermediate axis (axis-B) being spaced apart from said handlebar axis (axis-A) in order to provide for off-centre steering, and said steering axis (axis-C) intersecting with said intermediate axis (axis-B);
   a bar linkage mechanism (500) having:
      a first V-link (35) being connected and concentric with said steering handle (32) along said handlebar axis (axis-A), said first V-link (35) being aligned to said steering handle (32), located below said steering handle (32), and angularly displaceable about said handlebar axis (axis-A),
      a second V-link (37) being connected and concentric to said steering column rod (36) along said intermediate axis (axis-B) for translation of motion from the steering handle (32) to said front wheel (10a) or to said front set of wheels, and said second V-link (37) being aligned to said steering column rod (36) located above said steering stem (30), and angularly displaceable about said intermediate axis (axis-B),
   at least one steering rod link (38a, 38b) connected to said first V-link (35) and said second V-link (37).

2. The steering mechanism for a vehicle as claimed in claim 1, wherein said steering axis about which said steering stem (30) is located and about which is angularly displaceable being longitudinally spaced apart from said handlebar axis about which said steering handle (32) is located and about which is angularly displaceable.

3. The steering mechanism for a vehicle as claimed in claim 1, wherein said handlebar axis and said steering axis are spaced apart by a distance, wherein said distance being adjustable by a user based on user comfort level that is desired, thereby providing a user adjustable steering.

4. The steering mechanism for a vehicle as claimed in claim 1, further comprising:
   a translation mechanism configured to translate angular displacement about said handlebar axis into angular displacement about said steering axis, wherein, said translation mechanism being a bevel gear mechanism or a worm gear mechanism.

5. The steering mechanism for a vehicle as claimed in claim 1, further comprising sensors and motor where said sensors are located at said steering handle axis and are configured to sense force and/or angular displacement of said steering handle (32) about said handlebar axis (axis-A) and said motor being configured to angularly displace said steering stem (30) (axis-C) in response and in correlation with said sensed force and/or angular displacement of said steering handle (32).

6. The steering mechanism for a vehicle as claimed in claim 1, wherein said steering mechanism being defined in terms of three axes, in that, an axis about which said steering handle (32) angularly displaces being said handlebar axis (axis-A), an axis about which said steering stem (30) angularly displaces being said steering axis (axis-C), and an axis about responsible for translation of motion from said steering handle (32) about said handlebar axis (axis-A) to said steering stem (30) about said steering axis (axis-C) being said intermediate axis (axis-B), wherein said steering axis and said intermediate axis has an intersection thereof and, at said intersection said velocity joint (34) is being provided.

7. The steering mechanism for a vehicle as claimed in claim 1, wherein said steering mechanism being defined in terms of three axes, in that, an axis about which said steering handle (32) angularly displaces being said handlebar axis (axis-A), an axis about which said steering stem (30) angularly displaces being said steering axis (axis-C), and an axis about responsible for translation of motion from said steering handle (32) about said handlebar axis (axis-A) to said steering stem (30) about said steering axis (axis-C) being said intermediate axis (axis-B), wherein said handlebar axis and said steering axis comprises an angle therebetween, and said angle being greater than 0 degrees.

8. The steering mechanism for a vehicle as claimed in claim 1, wherein said steering mechanism being defined in terms of three axes, in that, an axis about which said steering handle (32) angularly displaces being said handlebar axis (axis-A), an axis about which said steering stem (30) angularly displaces being said steering axis (axis-C), and an axis about responsible for translation of motion from said steering handle (32) about said handlebar axis (axis-A) to said steering stem (30) about said steering axis (axis-C) being said intermediate axis (axis-B), wherein said handlebar axis and said steering axis being parallel to each other.

9. The steering mechanism for a vehicle as claimed in claim 1, wherein said steering mechanism being defined in terms of three axes, in that, an axis about which said steering handle (32) angularly displaces being side handlebar axis (axis-A), an axis about which said steering stem (30) angularly displaces being said steering axis (axis-C), and an axis about responsible for translation of motion from said steering handle (32) about said handlebar axis (axis-A) to said steering stem (30) about said steering axis (axis-C) being said intermediate axis (axis-B), wherein, said steering axis and said intermediate axis being concentric and parallel to said handlebar axis.

10. The steering mechanism for a vehicle as claimed in claim 1, wherein said steering mechanism being defined in terms of three axes, in that, an axis about which said steering handle (32) angularly displaces being said handlebar axis (axis-A), an axis about which said steering stem (30) angularly displaces being said steering axis (axis-C), and an axis about responsible for translation of motion from said steering handle (32) about said handlebar axis (axis-A) to said steering stem (30) about said steering axis (axis-C) being said intermediate axis (axis-B), wherein said steering axis and said intermediate axis being concentric and at an angle greater than 0 degrees to said handlebar axis.

11. The steering mechanism for a vehicle as claimed in claim 1, wherein said steering rod link (38*a*, 38*b*) being a link selected from a solid link or a flexible link.

12. The steering mechanism for a vehicle as claimed in claim 1, wherein said steering handle (32) defines an angular displacement and that said angular displacement is made variable by said bar linkage mechanism (500), angular displacement is made variable by means of different radii (D1, D2) of angular displacement as per said first V-Link (35) and said second V-link (37).

13. The steering mechanism for a vehicle as claimed in claim 1, wherein angular displacement, of said steering handle (32) is made variable by said bar linkage mechanism (500), angular displacement is made variable by means of different radii (D1, D2) of angular displacement as per said first V-Link (35) and said second V-link (37), wherein,
    a first distance (D1) defined by a first point defined by a point about which said steering handle (32) angularly displaces and a second point defined by a locus of points equidistant from said first point, said second point being equal to a point of said first V-link (35) where it connects to at least a steering rod link (38*a*, 38*b*) extending towards said steering stem (30);
    a second distance (D2) defined by a third point defined by a point about which said steering column rod (36) angularly displaces and a fourth point defined by a locus of points equidistant from said third point, said fourth point being equal to a point of said second V-link (37) where it connects to at least a steering rod link (38*a*, 38*b*) extending towards said steering handle (32), wherein,
    for 1:1 angular displacement translation from said handlebar axis (axis-A) to said intermediate axis (axis-B), said first distance (D1) being equal to said second distance (D2).

14. The steering mechanism for a vehicle as claimed in claim 1, wherein angular displacement, of said steering handle (32) is made variable by said bar linkage mechanism (500), angular displacement is made variable by means of different radii (D1, D2) of angular displacement as per said first V-Link (35) and said second V-link (37), wherein,
    a first distance (D1) defined by a first point defined by a point about which said steering handle (32) angularly displaces and a second point defined by a locus of points equidistant from said first point, said second point being equal to a point of said first V-link (35) where it connects to at least a steering rod link (38*a*, 38*b*) extending towards said steering stem (30);
    a second distance (D2) defined by a third point defined by a point about which said steering column rod (36) angularly displaces and a fourth point defined by a locus of points equidistant from said third point, said fourth point being equal to a point of said second V-link (37) where it connects to at least a steering rod link (38*a*, 38*b*) extending towards said steering handle (32), wherein,
    for oversteering angular displacement translation from said handlebar axis (axis-A) to said intermediate axis (axis-B), said first distance (D1) being greater than said second distance (D2).

\* \* \* \* \*